United States Patent [19]

Kagawa et al.

[11] Patent Number: 5,580,711

[45] Date of Patent: Dec. 3, 1996

[54] SILVER HALIDE PHOTOGRAPHIC LIGHT-SENSITIVE MATERIAL

[75] Inventors: Nobuaki Kagawa; Noriyasu Kita, both of Hino, Japan

[73] Assignee: Konica Corporation, Tokyo, Japan

[21] Appl. No.: 619,152

[22] Filed: Mar. 21, 1996

Related U.S. Application Data

[63] Continuation of Ser. No. 527,498, Sep. 13, 1995, abandoned, which is a continuation of Ser. No. 202,743, Feb. 28, 1994, abandoned.

[30] Foreign Application Priority Data

Mar. 2, 1993 [JP] Japan .................................. 5-041289

[51] Int. Cl.$^6$ .............................. G03C 1/22; G03C 1/28
[52] U.S. Cl. ...................... 430/567; 430/573; 430/577; 430/578; 430/592; 430/593
[58] Field of Search ..................... 430/572, 573, 430/574, 576, 577, 578, 591, 592, 593, 567

[56] References Cited

U.S. PATENT DOCUMENTS

| | | | |
|---|---|---|---|
| 2,454,629 | 11/1948 | Brooker .................................. | 548/181 |
| 2,493,747 | 1/1950 | Brooker et al. ......................... | 430/577 |
| 2,493,748 | 1/1950 | Brooker et al. ......................... | 430/577 |
| 2,519,001 | 8/1950 | Sprague ................................. | 430/577 |
| 2,743,272 | 4/1956 | Knott ..................................... | 430/581 |
| 2,933,390 | 4/1960 | McFall et al. .......................... | 430/550 |
| 3,335,010 | 8/1967 | Taber et al. ............................ | 430/522 |
| 3,416,927 | 12/1968 | Kalenda ................................. | 430/550 |
| 3,469,987 | 9/1969 | Owens et al. ........................... | 430/580 |
| 3,511,664 | 5/1970 | Nakazawa et al. ..................... | 430/552 |
| 3,615,613 | 10/1971 | Shiba et al. ............................ | 430/576 |
| 3,615,632 | 10/1971 | Shiba et al. ............................ | 430/572 |
| 3,615,633 | 10/1971 | Brooks .................................. | 430/573 |
| 3,635,721 | 1/1972 | Sato et al. .............................. | 430/576 |
| 3,676,147 | 7/1972 | Boyer et al. ............................ | 430/569 |
| 3,682,640 | 8/1972 | Shiba et al. ............................ | 96/99 |
| 3,822,135 | 7/1974 | Sakai et al. ............................ | 430/570 |
| 4,030,927 | 6/1977 | Tani ...................................... | 430/550 |
| 4,307,183 | 12/1981 | Delfino .................................. | 430/495 |
| 4,780,404 | 10/1988 | Sills et al. .............................. | 430/572 |
| 4,814,264 | 3/1989 | Kishida et al. ......................... | 430/581 |
| 5,116,722 | 5/1992 | Callant et al. ......................... | 430/578 |

FOREIGN PATENT DOCUMENTS

| | | | |
|---|---|---|---|
| 0427892 | 5/1991 | European Pat. Off. . | |
| 0540295 | 5/1993 | European Pat. Off. ............... | 430/593 |
| 2058405 | 5/1971 | France . | |
| 100347 | 4/1993 | Japan ..................................... | 430/593 |
| 0677409 | 5/1991 | Switzerland ........................... | 430/591 |
| 212749 | 12/1966 | U.S.S.R. ................................ | 430/578 |
| 606141 | 8/1948 | United Kingdom . | |

OTHER PUBLICATIONS

Database WPI, Week 9246, Derwent Publications Ltd., London, GB; AN 92–376960 (46) and JP–A–4 276 738 (Konica Corp.) 1 Oct. 1992 abstract.
European Search Report in EP 94 30 1376, Jun. 20, 1994.

*Primary Examiner*—Lee C. Wright
*Attorney, Agent, or Firm*—Finnegan, Henderson, Farabow, Garrett & Dunner, L.L.P.

[57] ABSTRACT

Disclosed is silver halide photographic light-sensitive material comprising a support and thereon at least one light-sensitive silver halide emulsion layer, wherein at least one layer of said light-sensitive silver halide emulsion layer contains silver halide grains spectrally sensitized with a dye selected from the group consisting of Formula S-I and Formula S-II:

Formula S-I

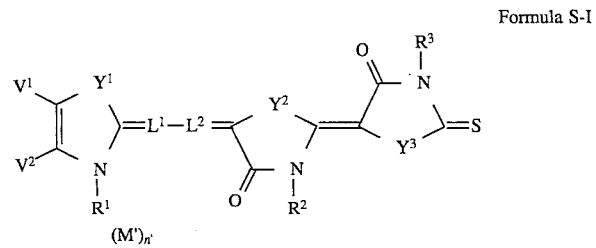

Formula S-II

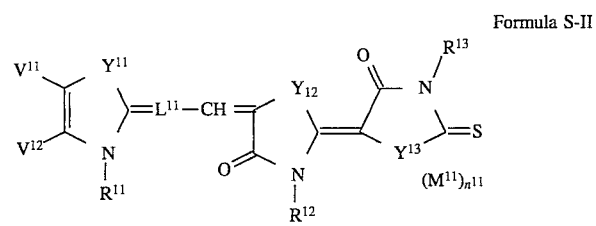

14 Claims, No Drawings

SILVER HALIDE PHOTOGRAPHIC LIGHT-SENSITIVE MATERIAL

This application is a continuation of prior application Ser. No. 08/527,498, filed Sep. 13, 1995, now abandoned, which is a continuation of Ser. No. 08/202,743, filed Feb. 28, 1994, abandoned.

FIELD OF THE INVENTION

The present invention relates to a silver halide photographic light-sensitive material of which spectral sensitivity to red light is enhanced and anti-staining property is improved.

BACKGROUND OF THE INVENTION

Means to expand sensitivity of spectral wave length region of silver halide emulsion, to enhance sensitivity is well-known as spectral sensitization. As for spectral sensitizing dye used for this purpose, a lot of compounds such as cyanine dyes and merocyanine dyes are known.

These spectral sensitization dyes are required not only to be capable of expanding light-sensitive wave length region of silver halide emulsion, but also to satisfy various other conditions given below:

1) The spectral sensitizing region is appropriate.
2) The spectral sensitization efficiency is high.
3) Occurrence of fog, gamma change, etc. do not adversely affect the characteristic curve.
4) When the silver halide photographic light-sensitive material comprising the sensitizing dye, especially when it is preserved for a long period of time under conditions of high humidity and high temperature), photographic properties such as fog do not change.
5) The dye incorporated does not diffuse to another layer of different spectral sensitivity and 6) the dye does not cause color contamination.
6) Color staining does not cause after development, fixation and washing or stabilization processes are completed due to dissolving of the dye into processing solution. However, the sensitizing dyes heretofore known in the art do not fully satisfy all these conditions, And they have not come up to the standard.

Especially, since processing time of the photographic material has become shorter and processing without washing or rinsing step with recycling use of the processing solution is adopted, the dye becomes more liable to remain in the photographic material. As a result, color contamination, which is hereinafter called as color stain, comes to take place easily in the photographic material and this remarkably damages the product value of the photographic material. In other words, as far as the sensitizing dyes are concerned, improvement in anti- color-staining property has become an important technical problem to be solved.

As the sensitizing dye which is capable of increasing sensitivity in red light wave length region, validity of the following dyes are known in the art. They are, for example, complex cyanine dyes and complex merocyanine dyes disclosed in Belgian Patent No. 541,245; U.S. Pat. Nos. 2,493,747, 2,743,272 and 3,335,010; French Patent No. 2,113,248; German Patents No. 1,024,800, 2,153,570 and 2,300,321; and Japanese Patent O.P.I. Publication Nos. 171135(1991); cyanine dyes disclosed in Japanese Patent O.P.I. Publications Nos. 11121(1974), 33622(1976), 115821(1976), and 115822(1976), 72937(1983), 203446(1986), Japanese Patent O.P.I. Publications Nos. 256045 (1991) and 1504251 (1991); Merocyanine dyes disclosed in Japanese Patent O.P.I. Publications Nos. 106422(1976) and 214030(1984); U.S. Pat. Nos. 2,493,747, 2,493,748 and 2,519,001. Cyanine dyes disclosed in Japanese Patent O.P.I. Publications Nos. 11121(1974), 33622(1976), 115821(1976) issues, and 115822(1976), 72937(1983), 203446(1986), Japanese Patent O.P.I. Publications Nos. 256045(1990), and 1504251(1991). It is a merocyanine dye of the description in each official report such as each specification, Japanese Patent O.P.I. Publication Nos. 106422(1970) issues, and 214030(1984) issues such as U.S. Pat. No. 2,493,747 issues, 2,493,748 issues, and 2,519,001 issues. The validity of these dyes is known. As for a part of these dyes, the color stain due to remaining dye may be reduced by introducing a water-solubilizing group in the molecule. However, it is not sufficient and has the problem such as causing the sensitivity variation depending on the aging of falling off of the spectral sensitization sensitivity and coating solution easily by storing the coating solution. The performance of these dyes are not still unsatisfactory.

In recent years, those dyes disclosed in European Patents No. 363,104 and 363,107 have a remarkable improved effect in anti-color-staining property. However, there is a problem that the photographic properties of the photographic material which has been optically sensitized by the use of these dyes tends to change easily with the lapse of time.

Moreover, in Japanese Patent O.P.I. Publications No. 54-18726(1979), 59-135461(1984), and 62-246045(1987) disclose a technique, by which spectral sensitivity is enhanced by using a sensitizing dye together with a certain kind of supersensitizing agent and the load of color staining is reduced, is disclosed. However, the effect of this technique still remains at an insufficient level and the further improvement is requested.

SUMMARY OF THE INVENTION

Therefore, the object of the present invention is to provide a silver halide photographic light-sensitive material to of which spectral sensitivity in the red light spectral region is enhanced and anti color staining property is improved.

The above-mentioned problem was solved by a following present invention. That is to say, present invention relates to a silver halide photographic light-sensitive material which comprises at least one light-sensitive silver halide emulsion layer on a support, wherein said silver halide photographic light-sensitive material is characterized in that said silver halide emulsion layer contains silver halide grains which are spectrally sensitized by the use of a dye represented by following Formula S-I;

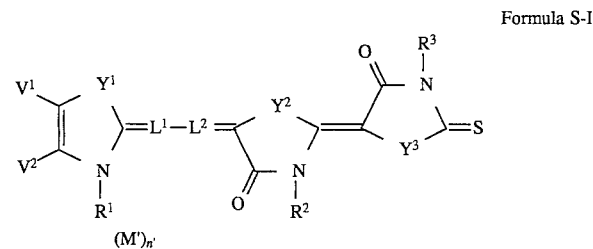

Formula S-I in the formula, $Y^1$, $Y^2$ and $Y^3$ independently represent a N(R)— group, an oxygen atom, a sulfur atom, a selenium atom or a tellurium atom, provided that at least one of $Y^1$, $Y^2$, and $Y^3$ is an oxygen atom;

$R^1$ represents an aliphatic group having from carbon atoms of not more than 10 having a water-solubilizing group as a substituent.

R, $R^2$, and $R^3$ independently represent an aliphatic group, an aryl group or a heterocyclic group, provided that at least two of R, $R^2$, and $R^3$ have the water solubilizing group as a substituent.

$V^1$ and $V^2$ Independently represent a hydrogen atom, an alkyl group, an alkoxy group, an aryl group or an atomic group necessary for forming a condensed ring together with an azole ring;

$L^1$ and $L^2$ independently represent a methine group which may have a substituent;

M' represents an ion necessary for cancelling a total electric charge of the molecule; and n' represents a number necessary for neutralizing the electric charge of the molecule.

Generally, when either of the methine dye represented by $L^1$ and $L^2$ is substituted, the dyes of the present invention achieve high spectral sensitivity. In addition, it was found that the dyes represented by the following Formula S-II are easily bleached in a processing bath. They have a preferable effect to reduce residual color.

Formula S-II

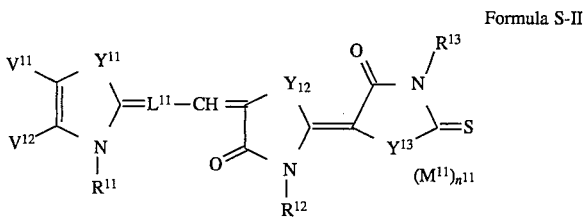

wherein $Y^{11}$, $Y^{12}$ and $Y^{13}$ independently represent a —$N(R^{10})$ group, a hydrogen atom, a sulfur atom, a selenium atom or a tellurium atom.

$R^{11}$ represents an aliphatic group having carbon atoms of not more than 10 having a water-solubilizing group as-a substituent. $R^{10}$, $R^{12}$ and $R^{13}$ independently represent an aliphatic group, an aryl group or a heterocyclic group, provided that at least two of $R^{10}$, $R^{12}$ and $R^{13}$ have a water-solubilizing group as a substituent. $V^{11}$ and $V^{12}$ independently represent a hydrogen atom, an alkyl group, an alkoxyl group, an aryl group or a group forming a condensed ring in combination with an azole. $L^{11}$ represents a substituted methine carbon.

$M^{11}$ represents an ion necessary for cancelling a total electric charge of a molecule; and $n^{11}$ represents a number necessary for neutralizing an electric charge of the molecule.

In addition, when silver halide grains are subjected to spectral sensitization by at least one kind of the dyes of the present invention contains an iridium compound in amount of $10^{-8}$ to $10^{-4}$ mol per mol of silver and the composition of silver halide includes silver chloride of at least 50 mol %, the silver halide grains achieve a high spectral sensitivity and a high storage stability.

DETAILED DESCRIPTION OF THE INVENTION

Hereinafter, the present invention is further described in detail.

In the compound represented by the above-mentioned formulas S-I and S-II. For instance, as for the water solubilizing group which substitute on R, $R^1$, $R^2$, $R^3$, $R^{10}$, $R^{11}$, $R^{12}$ and $R^{13}$, acid group such as sulfo group, carboxyl group, phosphono group, sulfate group and sulfino groups are mentioned.

As for the aliphatic group represented by R, $R^1$, $R^2$, $R^3$, $R^{10}$, $R^{11}$, $R^{12}$ and $R^{13}$, for example, an alkyl group having 1–10 carbon atoms, which may be either of straight chain or of branched alkyl group such as methyl group, ethyl group, and n-propyl group, n-pentyl group, isobutyl group; an alkenyl group having 3–10 carbon atoms such as 3-butenyl group, 2-propenyl group, etc.; an aralkyl group having 3–10 carbon atoms such as benzyl group, phenetyl group, etc.; can be mentioned. As for the aryl group represented by R, $R^2$, $R^3$, $R^{10}$, $R^{12}$ and $R^{13}$, for example, phenyl group; as for the heterocyclic group, for example, 2-pyridyl group, 4-pyridyl group, 2-furyl group, 2-thienyl group, sulforanyl group, tetrahydrofuryl group, pyperidinyl group, etc. can be mentioned. Each group represented by R, $R^1$, $R^2$, $R^3$, $R^{10}$, $R^{11}$, $R^{12}$ and $R^{13}$ may be substituted by, for example, a halogen atom such as fluorine atom, chlorine atom, bromine atom, etc.; an alkoxy group such as methoxy group, ethoxy group, etc.; an aryloxy group such as phenoxy group, p-toluoyloxy group, etc.; cyano group, carbamoyl group such as carbamoyl group, N-methylcarbamoyl group, N,N-tetramethylenecarbamoyl group, etc.; sulfamoyl group such as sulfamoyl group, N,N-3-oxapentamethyleneaminosulfonyl group, etc.; methanesulfonyl group; an alkoxycarbonyl group such as ethoxycarbonyl group, butoxycarbonyl group, etc.; an aryl group such as phenyl group, carboxyphenyl group, etc.; an acyl group such as acetyl group, benzoyl group, etc.

As specific example of the aliphatic group having therein the water solubilizing group, for example, carboxymethyl group, sulfoethyl group, sulfopropyl group, sulfobutyl group, sulfopentyl group, 3-sulfobutyl group, 6-sulfo-3-oxahexyl group, ω-sulfopropoxycarbonylmethyl group, ω-sulfopropylaminocarbonylmethyl group, 3-sulfinobutyl group, 3-phosphonopropyl group, 4-sulfo-3-butenyl group, 2-carboxy-2-propenyl group, o-sulfobenzyl group, p-sulfophenetyl group, o-carboxybenzyl group, etc. can be mentioned.

As for specific example of aryl group which is substituted by the water solubilizing group, for example, p-sulfophenyl group, p-carboxyphenyl group, etc. can be mentioned. As for specific example of heterocyclic group which is substituted by the water solubilizing group, for example, 4-sulfothienyl group, 5-carboxypyridyl group can be mentioned. $R^1$ and $R^{11}$ is alkyl group substituted by the sulfo group. Further, it is preferable that at least two of R, $R^2$, $R^3$, $R^{10}$, $R^{12}$ and $R^{13}$ are carboxymethyl groups.

As for the alkyl group represented by $V^1$, $V^2$, $V^{11}$ and $V^{12}$, a straight chained group or a branched group, for example, methyl group, ethyl group, isopropyl group, t-butyl group, isobutyl group, t-pentyl group, hexyl group, etc., can be mentioned.

As for the alkoxy group represented by $V^1$, $V^2$, $V^{11}$ and $V^{12}$, for example, methoxy group, ethoxy group, propoxy group, etc. can be mentioned. The aryl group represented by $V^1$, $V^2$, $V^{11}$ and $V^{12}$, may have a substituent at an arbitrary position and this includes, for example, phenyl group, p-tryl group, p-hydroxy phenyl group, p-methoxy phenyl group, etc. As for the Condensed ring which is formed together with $V^1$ and $V^2$ or $V^{11}$ and $V^{12}$ and the azole ring, for example, benzoxazole, 4,5,6,7-tetrahydrobenzoxazole, naphtho(1,2-d)oxazole, naphtha(2,3-d)oxazole, benzothiazole, 4,5,6,7-tetrahydrobenzothiazole, naphtha(1,2-d) thiazole, naphtha(2,3-d)thiazole, benzoselenazole, naphtha(1,2-d)selenazole, naphtha(2,3-d)selenazole, etc. can be mentioned. On the above-mentioned substituent represented by $V^1$, $V^2$, $V^{11}$ and $V^{12}$ and the condensed ring there may be a substituent at an arbitrary position and it includes, for example, a halogen atom such as fluorine atom, chlorine atom, bromine atom, iodine atom; trifluoromethyl group, an unsubstituted alkoxy group such as methoxy group, ethoxy group, butoxy group, a substituted alkoxy group such as 2-methoxyethoxy group, benzyloxy group; hydroxy group, cyano group, an aryloxy group such as unsubstituted or substituted phenoxy group, unsubstituted or substituted toluyloxy group, an aryl group such as phenyl group, p-chlorophenyl group, a styryl group, a heterocyclic group such as furyl group, thienyl group, a carbamoyl group such as carbamoyl group, N-ethylcarbamoyl group; a sulfamoyl group such as sulfamoyl group, N,N-dimethylsulfamoyl group; an acylamino group such as acetylamino group, propionylamino group, benzoylamino group; an alkoxycarbonyl group such as ethoxycarbonyl group; a sulfonamide group such as methanesulfonylamide group, benzenesulfonamide; a sulfonyl group such as methane sulfonyl group, p-toluenesulfonyl group; a carboxyl group.

As for the group on the methine carbon atom represented by $L^1$, $L^2$ and $L^{11}$, for example, an alkyl group such as methyl group, ethyl group, etc.; a phenyl group such as phenyl group, carboxyphenyl group, etc.; an alkoxy group such as methoxy group, ethoxy group, etc.; can be mentioned.

$M^1$ and $M^{11}$ independently represent a cation or an acid anion. A specific example of cation includes proton, an organic ammonium ion such as triethyl ammonium, triethanol ammonium; an inorganic cation such as lithium ion, sodium ion, calcium ion, etc. and as for the example of acid anion, for example, a halogen ion such as chloride ion, bromide ion, iodide ion; p-toluenesulfonic acid ion, perchloric acid ion, boron tetracfluoride ion may be mentioned.

When the molecular forms an internal salt and the electric charge is neutralized, $n^1$ and $n^{11}$ are 0.

The specific examples of the sensitizing dye represented by formulas S-I and S-II are given below. However, it should be understood that the present invention is by no means restricted to such specific examples.

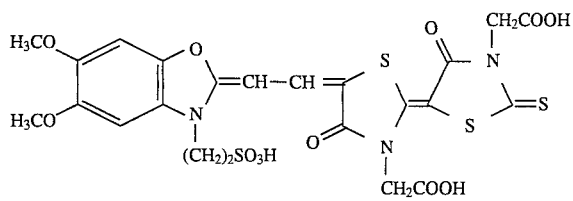

S-1

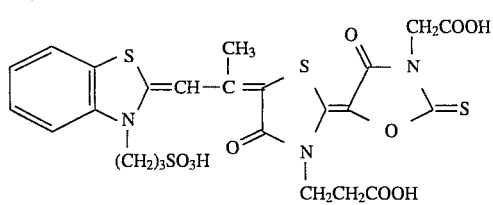

S-2

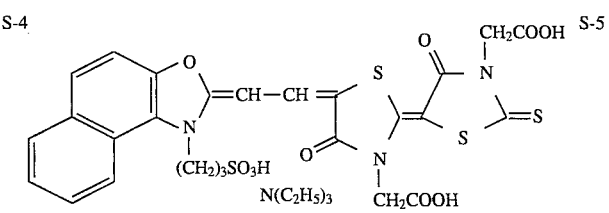

S-3

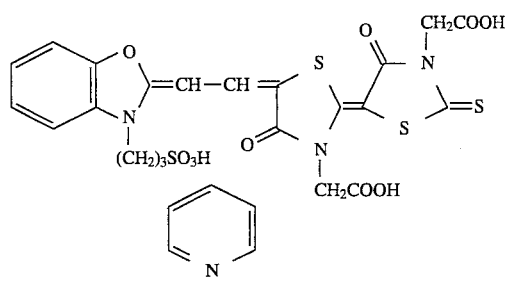

S-4

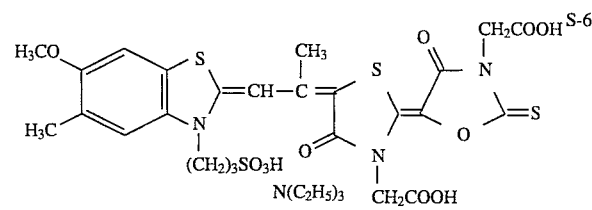

S-6

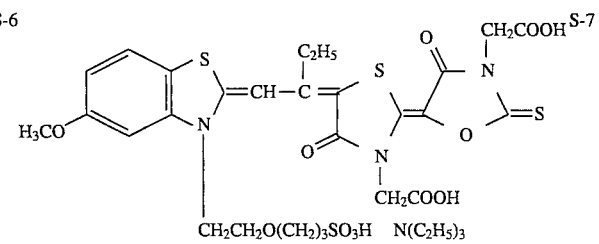

S-7

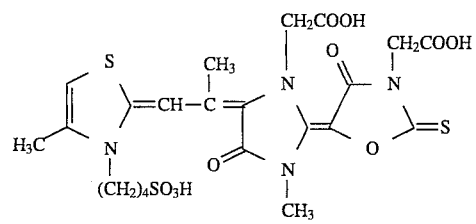

S-8

-continued
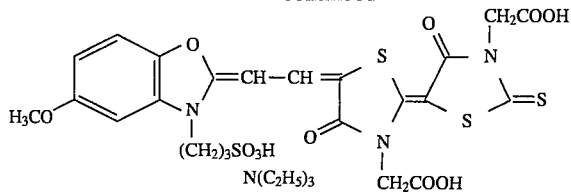
S-9
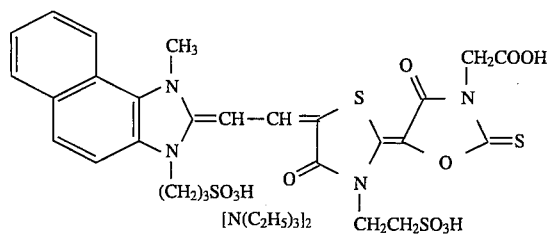
S-10
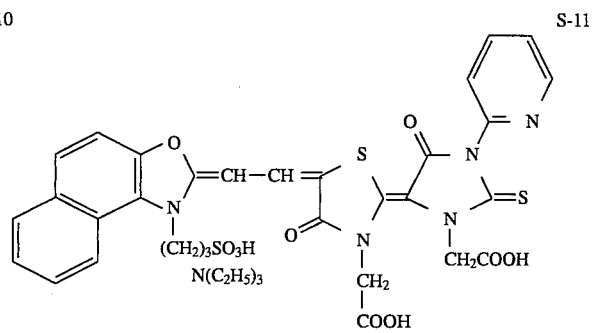
S-11
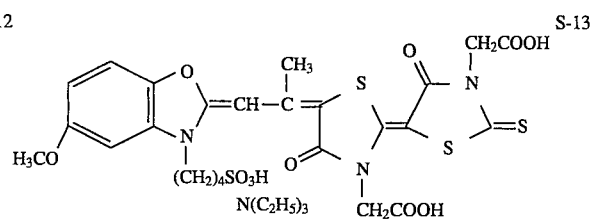
S-12
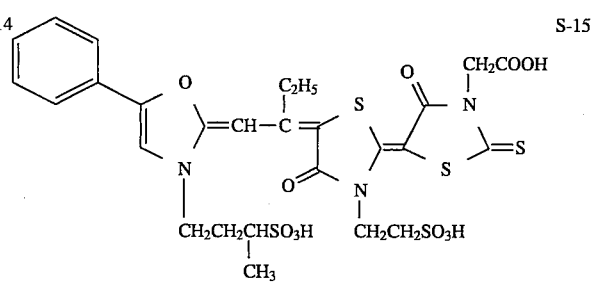
S-13
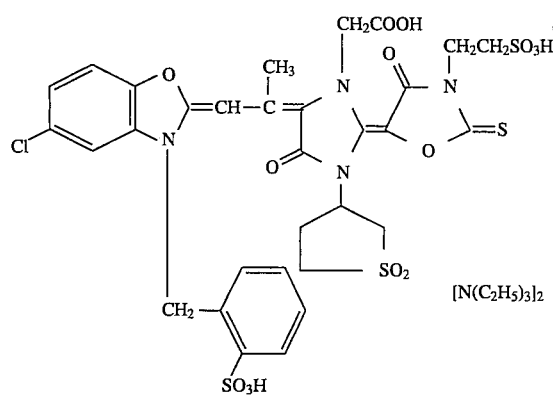
S-14
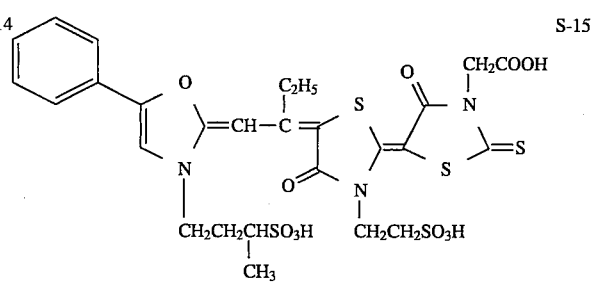
S-15
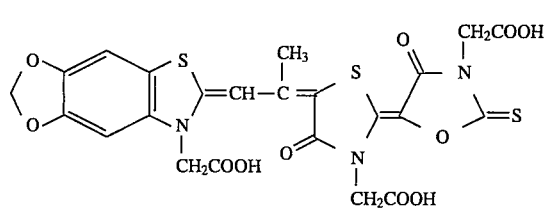
S-16
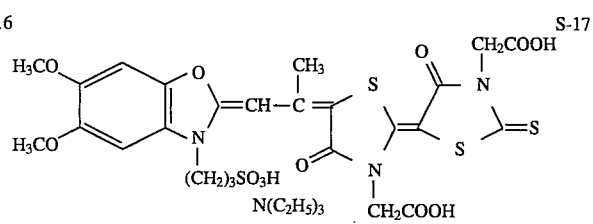
S-17
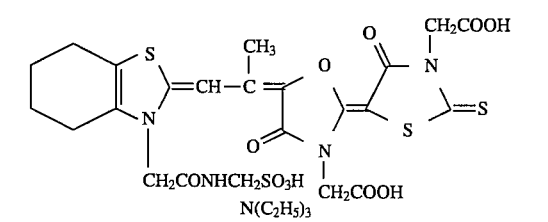
S-18
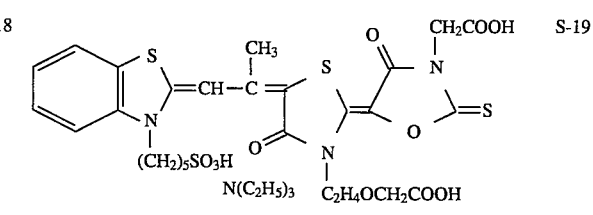
S-19

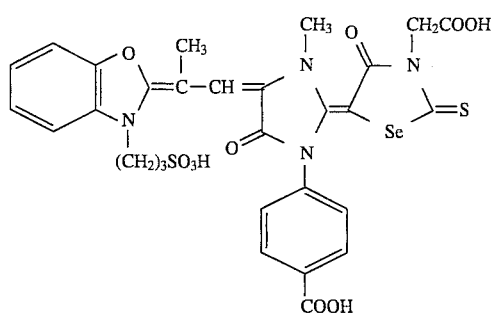
S-20
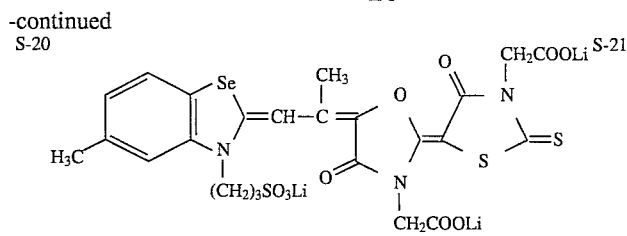
S-21
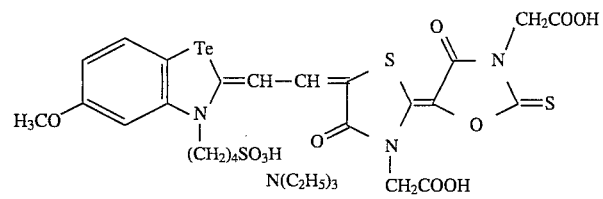
S-22
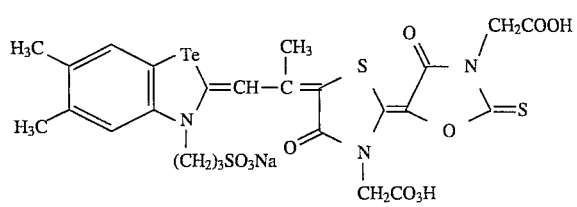
S-23
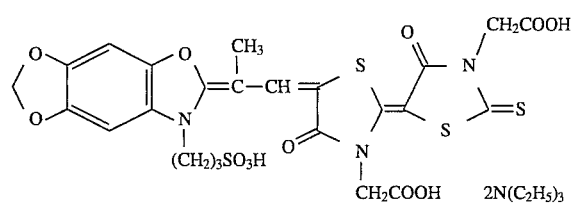
S-24
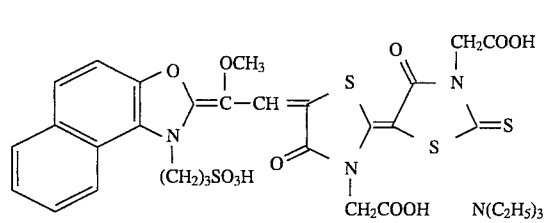
S-25
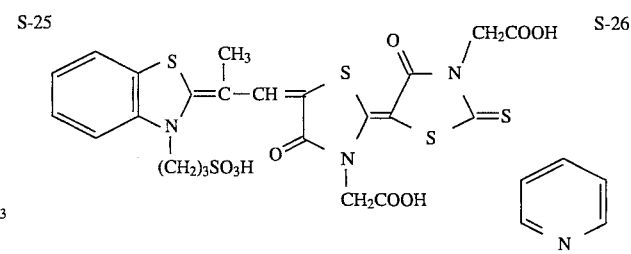
S-26
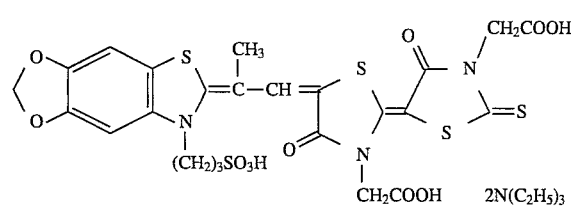
S-27
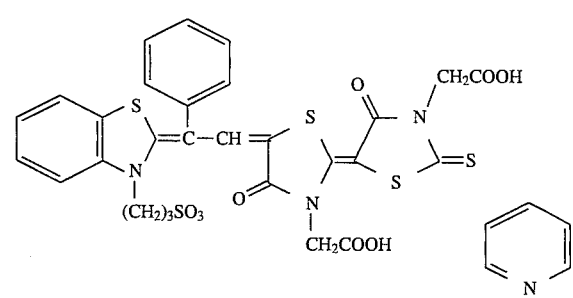
S-28

The above-mentioned compounds used in the present invention can normally be synthesized by a conventional method. For example, it can be easily synthesized by a method described in "Cyanine Dyes and Related Compounds", written by F. M. Hammer and published by Inter Science Publishers in U.S. Pat. Nos. 2,454,629 and 2,493,748, etc.

The specific synthetic examples, are given below: Other exemplified compounds may be synthesized by the similar method.

Synthesis example 1 (exemplified compound S-9)

2.43 g of 4-oxo-5-(2-(5-methoxy-3-(3-sulfopropyl)-2(3H)-benzoxazolidine)ethylidine)-2-thioxothiazolidine-3-il acetic acid was mixed with 5.6 g of p-toluene sulfonic acid methyl ester and stirred for 120 minutes at 130° C. After the mixture was cooled down to the room temperature, isopropyl ether was added to a viscous reactant and left as it was under agitation. Then, the supernatant liquid was excluded by inclining. Then 1 g of 4-oxo-2-thioxothiazolidine-3-il acetic acid was added to the reaction product. Subsequently, 10 ml of pyridine was added to the residue and it was gently refluxed for a period of 20 minutes under heating. Then the reaction product was cooled down for crystallization. After taking off the sediment filtration, it was washed with ethanol solvent.

Crude crystal thus obtained was recrystallized from methanol solvent and 1.1 g of dye was obtained. The maximum absorption wave length of this dye in the methanol solution was 547 nm.

Synthesis example 2 (exemplified compound S-24)

4-oxo-5-[2-[7-(3-sulfopropyl)-6(7H)-dioxolo[4,5-f]benzooxazolilidene]propylidene]-2-thioxothiazolizine-3-il acetate of 2.6 g was mixed with dimethyl sulfate of 2.5 g. The mixture was heated and stirred at 130 ° C. for 60 minutes. After returning to room temperature, isopropyl ether was added to the above-mentioned reacted product with high viscosity. The resulting mixture was stirred and left. Following that, the supernatant liquid was removed by inclining the vessel. To the resulting solution, 4-oxo-2-thioxothiazolizine-3-il acetate of 1 g was added. Following that, pyridine of 10 ml and triethylamine of 1 ml were added thereto. The mixture was heated for 20 minutes and refluxed. After that, the mixture was chilled and crystals were coagulated. The precipitant was filtrated and washed with ethanol solvent.

The resulting coarse crystals were re-crystallized from the methanol solvent so that a dye of 1.2 g was prepared.

The absorption maximum wavelength in the methanol solution was 576 nm.

The addition amount of the compound used in the present invention varies depending upon conditions used and the kind of emulsion to a great extent. Preferable to be $1 \times 10^{-6}$ to $5 \times 10^{-3}$ mol and more preferable to be $2 \times 10^{-6}$ to $2 \times 10^{-3}$ mol per mol of silver halide.

The compound represented by formula S-I for which in the present invention is used can be added to the silver halide emulsion according to the method which is conventionally known to date. For example, the method disclosed in Japanese Patent O.P.I. Publication Nos. 80826(1975) and 80827(1975). The method, disclosed in U.S. Pat. No. 3,822,135 and Japanese Patent O.P.I. Publication No. 11419(1975), in which the dye is added to the silver halide emulsion by dispersion with a surface active agent. The method disclosed in U.S. Pat. Nos. 3,676,147, 3,469,987, 4,247,3, Japanese Patent O.P.I. Publications Nos. 59942(1976), 16624(1978), 102732(1978), 102733(1988) and 137131(1988), wherein the dye is dispersed in a hydrophilic substance and added to the silver halide emulsion. The method disclosed in East German Patent No. 143,324, in which the dye is added in the form of a solid solution; or the method disclosed in Research Disclosure No. 21,802, Japanese Patent Publication Nos. 40659(1975), 148053,(1984), etc., in which the dye is dissolved either in an aqueous solvent or a low boiling point organic solvent such as water, methanol, ethanol, propanol, acetone, alcohol fluoride, etc.; a high boiling point organic solvent such as dimethylformamide, methylcellosolve, phenylcellosolve, etc.; or a mixture of the low boiling point organic solvent and the high boiling point organic solvent and added to the silver halide emulsion; etc. may optionally be applied.

The addition time of the compound of the present invention shown by the above-mentioned formula may be during any optional step in the emulsion manufacturing step containing physical ripening step, the end of chemical ripening and coating step. Preferably, it is added between physical ripening step and the end of chemical ripening step.

In the step of physical ripening or chemical ripening, it is preferable to add a sensitizing dye prior to the addition of a chemical sensitizer or immediately after the addition of chemical sensitizer because higher spectral sensitivity can be obtained.

Moreover, the sensitizing dye represented by formulas S-I and S-II can be used either singly or together with other sensitizing dye. In this case, each of sensitizing dyes may be added to the silver halide emulsion either simultaneously or separately. And order and interval of addition may optionally be decided depending upon the object.

The sensitizing dye represented by the formulas S-I and S-II used in the present invention may bring the effect of supersensitization when it is used together with a compound known as a supersensitizer. As for the compound which has supersensitizing effect, for example, compounds having a pyrimidinylamino group or a triazinylamino group as disclosed in U.S. Pat. Nos. 2,933,390, 3,416,927, 3,511,664, 3,615,613, 3,615,632 and 3,635,721; Japanese Patent O.P.I. Publication Nos. 15042(1991), 110545(1991) and 255841(1992); Organo-aromatic formaldehyde condensation compounds disclosed in British Patent No. 1,137,580 and Japanese Patent O.P.I. Publication Nos. 169833(1986), etc.; calixarene derivatives disclosed in Japanese Patent O.P.I. Publication No. 184332(1992); benzotriazole halogenides derivatives disclosed in U.S. Pat. No. 4,030,927; Bispyridinium compounds disclosed in Japanese Patent O.P.I. Publications Nos. 142541(1984) and 188641(1984); Aromatic heterocyclic quadrants disclosed in Japanese Patent O.P.I. Publication No. 191032(1984); Electron donative compounds disclosed in Japanese Patent O.P.I. Publication No. 79348(1985); Polymers containing an aminoanilidenemarononitrile unit as disclosed in U.S. Pat. No. 4,307,183; Hydroxytetrazaindene derivatives as disclosed in Japanese Patent O.P.I. Publication No. 149937(1992); 1,3-oxadiazole derivatives disclosed in U.S. Pat. No. 3,615,633: amino-1,2,3,4-thiatriazole derivatives as disclosed in U.S. Pat. No. 4,780,404; etc. can be mentioned.

There is no special limitation concerning the addition time of the supersensitizing agent and it is possible to add optionally based on the addition time of the sensitizing dye. In this case the addition amount is selected within a range of $1\times10^{-6}$ to $1\times10^{-1}$ mol per mol of silver halide, and the additive mole ratio of the super sensitizing agent to the sensitizing dye is 1:10 to 10:1.

The silver halide emulsion used in the present invention contains silver halide grains containing $10^{-8}$ to $10^{-4}$ mol of iridium compound per mol of silver and silver chloride content of said silver halide grain is at least 50 mol %. Preferably, the silver halide grain contains $10^{-7}$ mol to $10^{-5}$ mol of iridium compound per mol of silver.

Silver halide grains may have any kind of crystal habit and, for example, cubic shape, octahedral shape or tabular shape having an aspect ratio is not less than 5 may optionally be used. A silver halide emulsion containing monodispersed silver halide grains having coefficient of variation expressed in terms of (standard deviation of the grain size)/(average grain size)×100 is not more than 15%, is preferably used.

The average grain size of silver halide grains is not specially limited, however, it is within the range of 0.05 to 2.0 μm and, preferably, the range of 0.1 to 1.0 μm.

The iridium compound used in the present invention is conventional so-called well-known compound disclosed, for example, in Japanese Patent Publication Nos. 4935(1968), 32738(1970), etc. To be more specific, the iridium trichloride, iridium tribromide, iridium tetrachloride, iridium tetrabromide, potassium hexachloroiridate (III), potassium hexabromoiridate (III), sodium hexachloroiridate (IV), potassium hexabromoiridate (IV), etc. can be mentioned. These iridium compounds may be used either singly or two or more kinds in combination.

As for the hydrophilic protective colloid used in the silver halide photographic light-sensitive material of the present invention, other than conventional photographic gelatin, other synthetic or natural hydrophilic polymers, for example, gelatin derivatives such as acetylated gelatin and phthalated gelatin, water-solubilizing cellulose derivatives, etc. may also be used.

In the silver halide photographic light-sensitive material of the present invention, if necessary, various techniques and photographic additives which are well known in the art can be employed. For example, auxiliary layers such as a layer for eliminating crossover light, a protective layer, a filter layer, an anti-halation layer, backing layer, etc. can be provided in addition to the light-sensitive silver halide emulsion layer. These layers may comprise various photographic additives which are known in the art, including, for example, chemical sensitizers, couplers, high boiling point organic solvents, anti-foggants, stabilizers, development accelerators, bleach accelerators, fixation accelerators, anti-color staining agents, formalin scavengers, color toning agents, hardeners, surface active agents, viscosity increasing-agents, plasticizers, ultra-violet light absorbers, anti-irradiation dyes, filtering light-absorbing agents, polymer latex, heavy metals, anti-static agents, matting agents, etc. in various manners known in the art. As for the support used for the silver halide photographic light-sensitive material of the present invention, for example, cellulose triacetate, cellulose nitrate, polyester such as polyethylene terephthalate and polyethylene naphthalate, polyolefine such as polyethylene, polystyrene, baryta paper laminated with polyethylene, etc., glass, metal, etc. can be mentioned. These supports may, if necessary, undergo a subbing treatment.

Detailed information concerning the above mentioned additives is disclosed in Research Disclosure No. 17,643, Vol. 176 (December 198) and No. 18,431, Vol. 184 (August 1979).

Development of the silver halide photographic light-sensitive material of the present invention, may be carried out, according to the method disclosed, for example, on pages 291 through 334, the fourth Edition of "The Theory of the Photographic Process" written by T. H. James and on page 100, Vol. 100 of "the American Chemical Society" (1951).

EXAMPLE

Then, the invention is described more practically by the following examples but the invention is not limited to them.

Example 1

Preparation of a silver halide emulsion a according to the present invention:

Silver chloroiodobromide emulsion containing 62 mol % of silver chloride; 0.5 mol % of silver iodide and the rest is silver bromide, prepared by the use of a double-jet precipitation.

$8\times10^{-7}$ mol of $K_2IrCl_6$ per mol of silver was added to the emulsion during the simultaneous mixing step and between the time when silver halide grains of which average grain size is 5% as large as that of the final attainment, are formed and when the silver halide grains of the final attainment are formed. Next, desalting the emulsion by the flocculation method using the modification gelatin processed with the phenyl isocyanate, and then the emulsion was dispersed in the gelatin, and the mixture of following compounds A and B and C were added as anti-fungal agents, and the emulsion, which consisted of a grain (10% of the coefficient of variation) of average grain size 0.3 μm a cube and single dispersion, was obtained.

The pH and pAg of the obtained emulsion were adjusted with citric acid and sodium chloride to 5.8 and 7.0 respectively. Next, chemical ripening was carried out at 60° C. by using the sodium thiosulfate, and chloroauric acids. Next, the chemical ripening was stopped after tetrazole of 5-mercapto of 1-phenyl and 4-hydrxy-6-methyl-1,3,3a,7tetrazaindene were added 60 mg and 600 mg respectively per mol of silver.

Next, by adding following additives (SA-1, Nu-1, NA-1, LX-1 and HD-1), coating composition of emulsion was prepared.

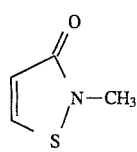

A

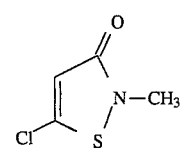

B

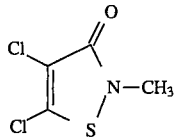
C

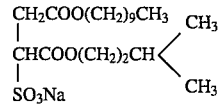
SA-1

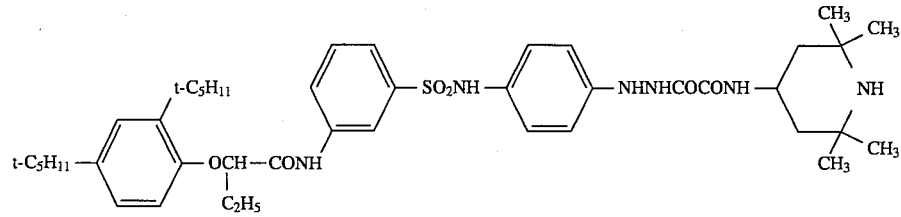
NU-1

NA-1

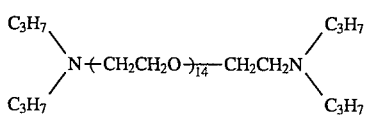

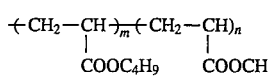
LX-1

[m:n = 50:50]

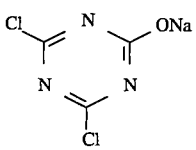
HD-1

Preparation of silver halide emulsion B (comparative sample):

Silver chloroiodobromide emulsion, of which 62 mol % a mol of silver is chloride, 0.5 mol % a mol of silver is silver iodide and the rest is silver bromide, was prepared by double-jet method.

After desalting the emulsion by the flocculation method using a gelatin derivative modified by phenyl isocyanate, and then the emulsion was dispersed in the gelatin. The mixture of above-mentioned compounds A, B and C were added as anti-fungal agents, and a silver halide emulsion comprising silver halide grains having coefficient of variation and the average grain size are 10% and 0.3 μm, respectively, was obtained.

By following the same procedure as the case of preparing Emulsion A, coating composition of emulsion B was prepared.

Preparation of silver halide emulsion C (comparative sample):

Silver chloroiodobromide emulsion, of which 40 mol % a mol of silver is chloride, 0.5 mol % a mol of silver is silver iodide and the rest is silver bromide, was prepared by double-jet method.

$8 \times 10^{-7}$ mol of $K_2IrCl_6$ per mol of silver was added to the emulsion during the simultaneous mixing step and between the time when silver halide grains of which average grain size is 5% as large as that of the final attainment are formed, and when the silver halide grains of the final attainment are formed. After desalting the emulsion by the flocculation method using a gelatin derivative modified by phenyl isocyanate and then the emulsion was dispersed in the gelatin. Then, the mixture of above-mentioned compounds A, B and C were added as anti-fungal agents, and a silver halide emulsion comprising cubic shaped silver halide grains having coefficient of variation and the average grain size are 10% and 0.3 μm, respectively, was obtained.

By following the same procedure as the case of preparing Emulsion A, coating composition of emulsion C was prepared. Preparation of a silver halide photographic light-sensitive material:

Silver halide emulsion layer of the following composition (1) was coated on one surface of polyethylene terephthalate film support having thickness of 100 μm on both surfaces of which are provided with a subbing layer having thickness of 0.1 microns. (cf. Example 1 of Japanese Patent O.P.I. Publication No. 19941(1984), so that the amount of the gelatin and silver coated become 2.0 g/m² and 3.2 g/m², respectively. Then protective layer of following composition (2) was furthermore coated on the silver halide emulsion layer so that the amount of the gelatin coated may be 1.0 g/m². Moreover, a backing layer was provided coated on the other side of the support according to following composition (3) so that the amount of the gelatin coated to be 2.4 g/m². The backing protective layer of following composition (4) was furthermore coated on that so that the amount of the gelatin coated may be 1.0 g/m² and the silver halide photographic light-sensitive material (Sample) was obtained. Herein, the addition amount is indicated as gram number per 1 m² of sample.

| Composition (1): Compositions of the silver halide emulsion layer | |
|---|---|
| Gelatin | 2.0 g |
| Silver halide emulsion: Emulsion A of present invention, comparative emulsions B and C: | 3.2 g |
| Sensitizing dye: Compound of present invention and comparative compounds <1> to <IV>: | $2 \times 10^{-4}$ mols/mole silver |
| Stabilizing agent: 4-methyl-6-hydroxy-1,3,3a,7-tetrazaindene | 30 mg |
| Antifoggant: Adenine: | 10 mg |
| Tetrazole 1-phenyl-5-mercaptotetrazole: | 5 mg |
| Surfactant: | |
| Saponin: | 0.1 g |
| SA-1: | 8 mg |
| Hydrazine derivative: NU-1: | 35 mg |
| Nucleation accelerator: NA-1: | 70 mg |
| Latex polymer: LX-1: | 1.0 g |
| Polyethylene glycol (molecular weight 4000) | 0.1 g |
| Hardener: HD-1 | 60 mg |

| Comparative Compound | |
|---|---|
| [I] | disclosed in U.S. Pat. No. 2,493,748 |

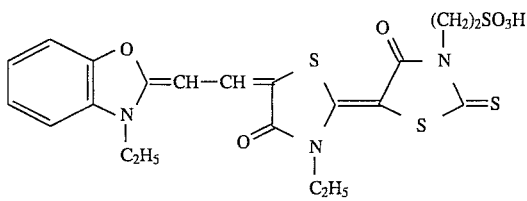

| [II] | disclosed in SU92,123 |
|---|---|

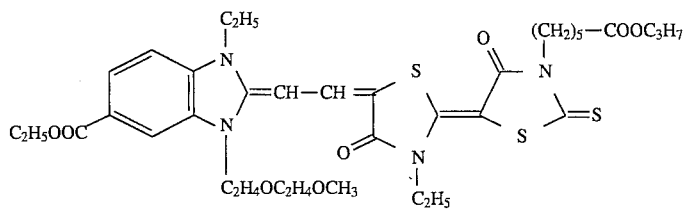

| [III] | disclosed in Japanese Patent O.P.I. Publication No. 171135(1992) |
|---|---|

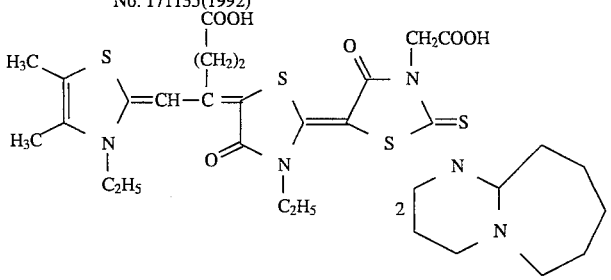

| [IV] | disclosed in Japanese Patent O.P.I. Publication No. 234032 |
|---|---|

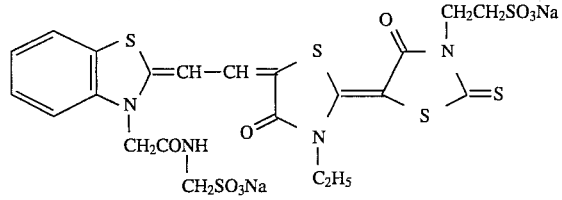

| Composition (2) (composition of the protective layer) | |
|---|---|
| Gelatin | 0.9 g |
| Surfactant: | |
| SA-2 | 10 mg |
| SA-3 | 10 mg |
| Matting agent: single dispersion silica grains having average grain size of 3.5 μm | 3 mg |
| Hardener: 1,3-vinylbisulfonyl-2-propanol | 40 mg |
| Composition (3) (Composition of the backing layer) | |
| Gelatin | 2.4 g |
| Surfactant: | |
| Saponin | 0.1 g |
| SA-1 | 6 mg |
| Colloidal silica | 100 mg |
| Coloring dye: | |
| F-1 | 30 mg |

-continued

| | |
|---|---|
| F-2 | 75 mg |
| F-3 | 30 mg |
| SA-2 | $CH_2COOCH_2CH(C_2H_5)C_4H_9$<br>$\|$<br>$CHCOOCH_2CH(C_2H_5)C_4H_9$<br>$\|$<br>$SO_3Na$ |
| SA-3 | $CH_2-COOCH_2(CF_2)_6H$<br>$\|$<br>$CH-COOCH_2(CF_2)_6H$<br>$\|$<br>$SO_3Na$ |

-continued

F-1
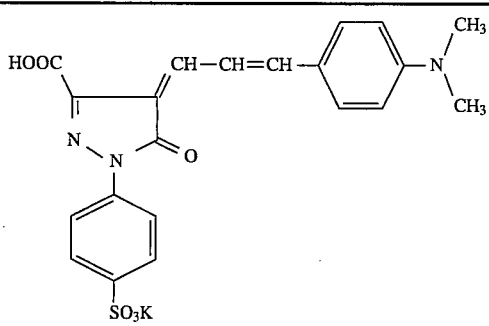

F-2
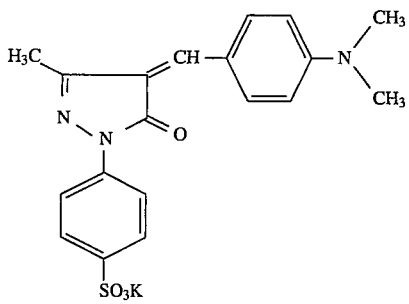

F-3
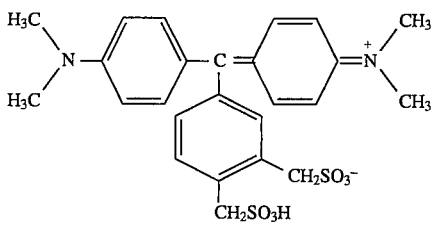

| Composition (4) (composition of the backing protective layer) | |
|---|---|
| Gelatin | 1.0 g |
| Surfactant: SA-2 | 10 mg |
| Matting agent: Single dispersion poly methyl methacrylate having average grain size of 5.0 μm | 50 mg |
| Hardener: Glyoxal | 35 mg |

To conduct an accelerated aging test, respective samples were devided into two groups. One of these groups were left undisturbed for three days and the other was stored at 50° C. and relative humidity at 20% RH for three days.

(Evaluation of photographic performance)

Each sample was placed in close contact with an optical wedge and exposed to light for a period of $10^{-5}$ seconds through Wratten filter No. 21. Then the sample was processed with a Rapid Processor GR-26S (manufactured by Konica Corporation) containing the following developer and the following fixer.

The density of the sample after developing was measured with optical densitometer Konica PDA-65 (manufactured by Konica Corporation) and the reciprocal of the exposure at fog density+3.0 was calculated and the as conventional method, sensitivity was indicated as a relative value to sensitivity of sample No. 1 (immediately after preparation) being adjusting to 100.

In addition, with regard to residual color ranking, residual color of a stack of 5 sheets of films were evaluated and divided into 5 ranks.

Those having no residual color at all were ranked as the highest "5". Depending upon the degree of the occurrence of residual color, the rank was lowered "4", "3", "2" and to "1". The ranks "2" and "1" are substantially not preferable.

[Developer composition]

| Potassium sulfite | 60.0 g |
|---|---|
| Hydroquinone | 15.0 g |
| 4-methyl-4-hydroxymethyl-1-phenyl-3-pyrazolidone | 1.0 g |
| Disodium ethylenediaminetetraacetate | 0.5 g |
| Potassium carbonate | 50.0 g |
| Potassium bromide | 5.0 g |
| 2-mercapto benzimidazole | 0.25 g |
| 5-methylbenztriazole | 0.4 g |

Add water to make the total volume 1 liter and adjust pH of the solution at 10.5 with potassium hydroxide.

[Composition of Fixing Solution]

| (Composition A) | |
|---|---|
| Ammonium thiosulfate (72.5% W/V aqueous solution) | 240 ml |
| Sodium sulfite | 17.0 g |
| Sodium acetate trihydrate | 6.5 g |
| Boric acid | 6.0 g |
| Sodium citrate dihydrate | 2.0 g |

| (Composition B) | |
|---|---|
| Pure water (ion exchanged) | 17 ml |
| Sulfuric acid (50% W/V aqueous solution) | 4.7 g |
| Aluminum sulfate (Al 2O3 conversion content is aqueous solution of 8.1% W/V) | 8.5 g |

Upon use of fixing solution above-mentioned Composition A and Composition B were dissolved in 500 ml of water in this order, and then the solution was finished up with water to make the total volume 1 liter for use. PH of this fixer was adjusted at 4.8 with acetic acid.

| Processing Step: | Temperature: | Time |
|---|---|---|
| Development: | 38 C.: | 20 seconds |
| Fixing: | 35 C.: | 20 seconds |
| Washing: | 30 C.: | 15 seconds |
| Drying: | 50 C.: | 15 seconds |

Results obtained are shown in Table 1.

TABLE 1

| No. I- | Sensitizing dye | Emulsion | No accelerated aged film | | | Accelerated aged film | | Remarks |
|---|---|---|---|---|---|---|---|---|
| | | | Sensitivity | Fogging | Residual color ranking | Sensitivity | Fogging | |
| 1 | S-1 | A | 100 | 0.04 | 4.5 | 102 | 0.05 | Inventive |
| 2 | S-2 | A | 103 | 0.04 | 4.5 | 104 | 0.05 | Inventive |
| 3 | S-5 | A | 99 | 0.04 | 4.0 | 100 | 0.05 | Inventive |
| 4 | S-7 | A | 104 | 0.04 | 4.5 | 103 | 0.05 | Inventive |
| 5 | S-8 | A | 97 | 0.04 | 5.0 | 99 | 0.05 | Inventive |
| 6 | S-9 | A | 98 | 0.04 | 4.5 | 100 | 0.05 | Inventive |
| 7 | S-10 | A | 95 | 0.05 | 4.5 | 98 | 0.06 | Inventive |
| 8 | S-11 | A | 101 | 0.04 | 4.0 | 104 | 0.05 | Inventive |
| 9 | S-12 | A | 105 | 0.04 | 4.5 | 107 | 0.05 | Inventive |
| 10 | S-13 | A | 107 | 0.04 | 4.5 | 109 | 0.05 | Inventive |
| 11 | S-14 | A | 99 | 0.04 | 4.0 | 100 | 0.05 | Inventive |
| 12 | S-15 | A | 96 | 0.04 | 4.5 | 98 | 0.05 | Inventive |
| 13 | S-17 | A | 109 | 0.04 | 4.5 | 111 | 0.05 | Inventive |
| 14 | S-18 | A | 102 | 0.04 | 5.0 | 105 | 0.06 | Inventive |
| 15 | S-21 | A | 103 | 0.05 | 4.0 | 105 | 0.05 | Inventive |
| 16 | S-24 | A | 111 | 0.04 | 4.5 | 112 | 0.05 | Inventive |
| 17 | S-26 | A | 110 | 0.04 | 4.5 | 112 | 0.05 | Inventive |
| 18 | S-27 | A | 113 | 0.04 | 4.5 | 114 | 0.05 | Inventive |
| 19 | [I] | A | 90 | 0.05 | 3.0 | 83 | 0.06 | Comparative |
| 20 | [II] | A | 82 | 0.04 | 1.5 | 74 | 0.08 | Comparative |
| 21 | [III] | A | 94 | 0.04 | 3.0 | 99 | 0.06 | Comparative |
| 22 | [IV] | A | 84 | 0.04 | 4.0 | 90 | 0.06 | Comparative |
| 23 | S-1 | B | 92 | 0.04 | 4.5 | 97 | 0.05 | Inventive* |
| 24 | S-12 | B | 96 | 0.04 | 4.5 | 101 | 0.05 | Inventive |
| 25 | S-17 | B | 100 | 0.04 | 4.5 | 105 | 0.05 | Inventive |
| 26 | S-21 | B | 94 | 0.04 | 4.0 | 99 | 0.05 | Inventive |
| 27 | S-24 | B | 101 | 0.04 | 4.5 | 106 | 0.05 | Inventive |
| 28 | S-27 | B | 103 | 0.04 | 4.5 | 108 | 0.05 | Inventive |
| 29 | [IV] | B | 80 | 0.04 | 4.0 | 86 | 0.06 | Comparative |
| 30 | S-1 | C | 93 | 0.04 | 4.5 | 96 | 0.05 | Inventive** |
| 31 | S-8 | C | 89 | 0.04 | 5.0 | 93 | 0.05 | Inventive |
| 32 | S-12 | C | 98 | 0.04 | 4.5 | 101 | 0.05 | Inventive |
| 33 | S-17 | C | 101 | 0.04 | 4.5 | 104 | 0.05 | Inventive |
| 34 | S-21 | C | 96 | 0.04 | 4.0 | 100 | 0.05 | Inventive |
| 35 | S-24 | C | 103 | 0.04 | 4.5 | 106 | 0.05 | Inventive |
| 36 | S-27 | C | 104 | 0.04 | 4.5 | 108 | 0.05 | Inventive |
| 37 | [IV] | C | 89 | 0.04 | 4.0 | 92 | 0.05 | Comparative |

*(Iridium salt free)
**(different halogen composition)

It is clear from the table that the silver halide photographic light-sensitive material according to the present invention, in comparison with comparative samples, has an improved photographic performance both in restraining fog occurrence and sensitivity fluctuation, with respect to the samples evaluated immediately after preparation and those which were subjected to incubation test. It was also found that this effect was remarkable in the sample in which a silver halide emulsion containing high silver chloride content and an iridium compound is used.

Moreover, the silver halide photographic light-sensitive material, which contains the compound according to the present invention, shows less color stain due to residual dye compared with the comparative samples.

Example 2

Each of Sample Nos. I-1 through 23, -27, -29, -32, -35, -36 and -37 prepared in Example 1 were divided into 2 groups. One group was left under the unchanged conditions, and the other group was stored for one day at 60% RH and 40° C.

(Evaluation of performance in terms of residual color)

Unexposed films prepared using the resulting samples were processed in the same manner as in Example 1 using the following model processing solutions containing the same sensitive dye. The residual color of stack of 5 sheets of films were evaluated visually and divided into 5 ranks.

Those having no residual color completely were defined to be the highest rank "5". Depending upon the degree of occurrence of residual color, the ranks were lowered such as "4", "3", "2" and to "1". The ranks "2" and "1" are substantially not preferable.

[Composition of developing solution]

| | |
|---|---|
| Potassium sulfite | 60.0 g |
| Hydroquinone | 15.0 g |
| 4-methyl-4-hydroxymethyl-1-phenyl-3-pyrazolidone | 1.0 g |
| Disodium salt of ethylenediamine tetraacetic acid | 0.5 g |
| Potassium carbonate | 50.0 g |
| Potassium bromide | 5.0 g |
| 2-mercaptobenzimidazole | 0.25 g |
| 5-methylbenzotriazole | 0.4 g |
| Sensitive dye: Compound of the present invention and comparative compound | 50 mg |

Water was added to make 1 liter, and pH was regulated to 10.5 with potassium hydroxide. Following that, the solution was subjected to aging for 1 hour at room temperature.

[Formula of fixing solution]

| (Composition A) | |
|---|---|
| Ammonium thiosulfate (an aqueous 72.5% W/V solution) | 240 ml |
| Sodium sulfite | 17.0 g |
| Sodium acetate trihydrate | 6.5 g |
| Boric acid | 6.0 g |
| Sodium citrate dihydrate | 2.0 g |

| (Composition B) | |
|---|---|
| Pure water (ion-exchanged water) | 17 ml |
| Sulfuric acid (an aqueous 50% W/V solution) | 4.7 g |
| Aluminum sulfate (an aqueous solution having 8.1 W/V when the content amount is converted to $Al_2O_3$) | 8.5 g |

When the fixing solution was used, the above-mentioned components A and B were dissolved in this order in 500 ml of water to make 1 l in total. pH of this fixing solution was regulated to 4.8.

Table 2 shows the results thereof.

TABLE 2

| No. II- | Sensitizing dye | Emulsion | No accelerated aged film Residual color ranking | Accelerated aged film Residual color ranking | Remarks |
|---|---|---|---|---|---|
| 1 | S-1 | A | 4.0 | 4.0 | Inventive |
| 2 | S-2 | A | 4.0 | 4.0 | Inventive |
| 3 | S-5 | A | 4.0 | 4.0 | Inventive |
| 4 | S-7 | A | 4.0 | 4.0 | Inventive |
| 5 | S-8 | A | 4.5 | 4.5 | Inventive |
| 6 | S-9 | A | 4.0 | 4.0 | Inventive |
| 7 | S-10 | A | 4.0 | 4.0 | Inventive |
| 8 | S-11 | A | 4.0 | 3.5 | Inventive |
| 9 | S-12 | A | 4.5 | 4.5 | Inventive |
| 10 | S-13 | A | 4.0 | 4.0 | Inventive |
| 11 | S-14 | A | 3.5 | 3.5 | Inventive |
| 12 | S-15 | A | 4.0 | 4.0 | Inventive |
| 13 | S-17 | A | 4.0 | 4.0 | Inventive |
| 14 | S-18 | A | 4.5 | 4.0 | Inventive |
| 15 | S-21 | A | 3.5 | 3.5 | Inventive |
| 16 | S-24 | A | 4.5 | 4.5 | Inventive |
| 17 | S-26 | A | 4.5 | 4.5 | Inventive |
| 18 | S-27 | A | 4.5 | 4.5 | Inventive |
| 19 | [I] | A | 2.5 | 2.0 | Comparative |
| 20 | [II] | A | 1.5 | 1.0 | Comparative |
| 21 | [III] | A | 2.5 | 2.0 | Comparative |
| 22 | [IV] | A | 3.5 | 3.0 | Comparative |
| 23 | S-1 | B | 4.0 | 4.0 | Inventive* |
| 24 | S-24 | B | 4.5 | 4.5 | Inventive |
| 25 | [IV] | B | 3.5 | 3.0 | Comparative |
| 26 | S-12 | C | 4.0 | 4.0 | Inventive** |
| 27 | S-24 | C | 4.5 | 4.5 | Inventive |
| 28 | S-27 | C | 4.5 | 4.0 | Inventive |
| 29 | [IV] | C | 3.5 | 3.0 | Comparative |

*(Iridium salt free)
**(different halogen composition)

The compound of the present invention is superior to comparative compounds [I] through [IV] in terms of residual color. In the model processing solution wherein dyes prepared on the assumption that a light-sensitive material is processed continuously and dyes dissolved therefrom accumulate in aforesaid processing solution were contained in advance, there was a tendency that residual color purity was deteriorated due to re-dyeing of the dyes. However, in the compound of the present invention, the influence from re-dyeing can be minimized. Especially, it can be understood that the compound represented by Formula [S-2] provides small residual color under poor conditions so that it has been improved.

In addition, with regard to residual color ranking, residual color of a stack of 5 sheets of films were evaluated and divided into 5 ranks.

Those having no residual color at all were ranked as the highest "5". Depending upon the degree of the occurrence of residual color, the rank was lowered "4", "3", "2" and to "1". The ranks "2" and "1" are substantially not preferable.

What is claimed is:

1. A silver halide photographic light-sensitive material comprising a support and thereon at least one light-sensitive silver halide emulsion layer, wherein at least one layer of said light-sensitive silver halide emulsion layer contains silver halide grains spectrally sensitized with a dye selected from the group consisting of Formula S-I and Formula S-II:

Formula S-I

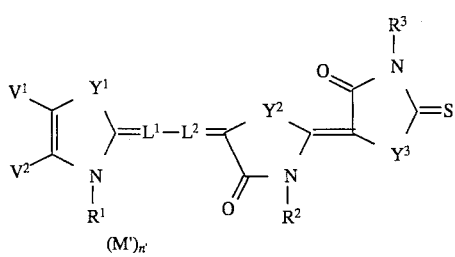

wherein, $Y^1$, $Y^2$ and $Y^3$ independently represent a —N(R)— group, an oxygen atom, a sulfur atom, a selenium atom or a tellurium atom, provided that at least one of $Y^1$, $Y^2$, and $Y^3$ is an oxygen atom; $R^1$ represents an aliphatic group containing not more than 10 carbon atoms and having a water-solubilizing group as a substituent; R, $R^2$, and $R^3$ each represents an aliphatic group, an aryl group or a heterocyclic group provided that at least two of R, $R^2$, and $R^3$ have the water solubilizing group as a substituent; $V^1$ and $V^2$ each represents a hydrogen atom, an alkyl group, an alkoxy group, an aryl group or an atomic group necessary for forming a condensed ring together with an azole ring; $L^1$ and $L^2$ each represents a substituted methine group or an unsubstituted methine group; M represents a counterion necessary for neutralizing an electric charge of a molecule; and n represents a number necessary for cancelling a total electric charge of the molecule;

Formula S-II

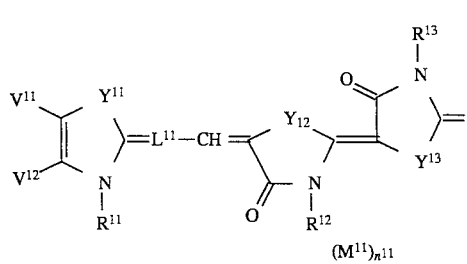

wherein, $Y^{11}$, $Y^{12}$ and $Y^{13}$ each represent a —N($R^{10}$)— group, an oxygen atom, a sulfur atom, a selenium atom or a tellurium atom, $R^{11}$ represents an aliphatic group containing not more than 10 carbon atoms and having a water-solubilizing group as a substituent; $R^{10}$, $R^{12}$, and $R^{13}$ each represents an aliphatic group, an aryl group or a heterocyclic group, provided that at least two of $R^{10}$, $R^{12}$, and $R^{13}$ have the water solubilizing group as a substituent; $V^{11}$ and $V^{12}$ each represents a hydrogen atom, an alkyl group, an alkoxy group, an aryl group or an atomic group necessary for forming a condensed ring together with an azole ring; $L^{11}$ represents a substituted methine group; $M^{11}$ represents a counterion necessary for neutralizing an electric charge of a molecule; and $n^{11}$ represents a number necessary for cancelling a total charge of the molecule.

2. The silver halide photographic light-sensitive material of claim 1, wherein said silver halide grain contains an iridium compound in amount of $10^{-8}$ to $10^{-4}$ mol per mol of silver; and a silver chloride content of said silver halide grain is at least 50 mol %.

3. The silver halide photographic light-sensitive material of claim 1, wherein the water solubilizing group is selected from a sulfo group, a carboxyl group, a phosphono group, a sulfate group or a sulfino groups.

4. The silver halide photographic light-sensitive material of claim 1, wherein the addition amount of said dye is $1\times10^{-6}$ to $5\times10^{-3}$ mol per mol of silver halide.

5. The silver halide photographic light-sensitive material of claim 1, wherein the addition amount of said dye is $2\times10^{-6}$ to $2\times10^{-3}$ mol per mol of silver halide.

6. The silver halide photographic light-sensitive material of claim 1, wherein a manufacturing step of the emulsion contained in said light-sensitive silver halide emulsion layer comprises a physical ripening step and a chemical ripening step and wherein said dye is added between the physical ripening step and the end of the chemical ripening step.

7. The silver halide photographic light-sensitive material of claim 1, wherein said emulsion layer further contains a supersensitizing agent in an amount within the range of $1\times10^{-6}$ to $1\times10^{-1}$ mol per mol of silver halide.

8. The silver halide photographic light-sensitive material of claim 1, wherein said emulsion layer further contains a supersensitizing agent in an amount such that the mole ratio of the supersensitizing agent to the sensitizing dye is 1:10 to 10:1.

9. The silver halide photographic light-sensitive material of claim 1, wherein said silver halide grain contains an iridium compound in amount of $10^{-5}$ mol to $10^{-7}$ mol per mol of silver.

10. The silver halide photographic light-sensitive material of claim 1, wherein said silver halide grains are monodispersed silver halide grains having a coefficient of variation of not more than 15%.

11. The silver halide photographic light-sensitive material of claim 1, wherein said the average grain size of said silver halide grains is within the range of 0.05 to 2.0 μm.

12. The silver halide photographic light-sensitive material of claim 1, wherein said the average grain size of said silver halide grains is within the range of 0.1 to 1.0 μm.

13. The silver halide photographic light-sensitive material of claim 1, wherein said iridium compound is selected from iridium trichloride, iridium tribromide, iridium tetrachloride, iridium tetrabromide, potassium hexachloroiridate (III), potassium hexabromoiridate (III), sodium hexachloroiridate (IV), potassium hexabromoiridate (IV).

14. A silver halide photographic light-sensitive material comprising a support and thereon at least one light-sensitive silver halide emulsion layer, wherein at least one layer of said light-sensitive silver halide emulsion layer contains silver halide grains spectrally sensitized with a dye represented by Formula S-II, and said silver halide grain contains an iridium compound in an amount of $10^{-8}$ to $10^{-4}$ mol per mol of silver; and a silver chloride content of said silver halide grain is at least 50 mol %:

Formula S-II

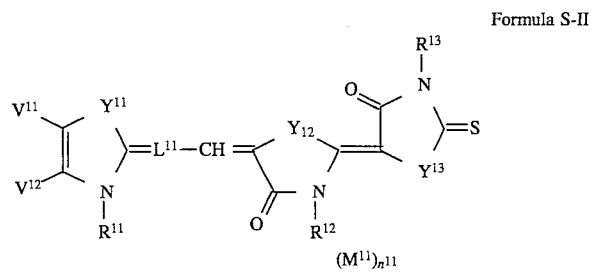

wherein, $Y^{11}$, $Y^{12}$ and $Y^{13}$ each represents a —N($R^{10}$)— group, an oxygen atom, a sulfur atom, a selenium atom or a tellurium atom, $R^{11}$ represents an aliphatic group containing not more than 10 carbon atoms and having a water-solubilizing group as a substituent; $R^{10}$, $R^{12}$, and $R^{13}$ each represents an aliphatic group, an aryl group or a heterocyclic group, provided that at least two of $R^{10}$, $R^{12}$, and $R^{13}$ have the water solubilizing group as a substituent; $V^{11}$ and $V^{12}$ each represents a hydrogen atom, an alkyl group, an alkoxy group, an aryl group or an atomic group necessary for forming a condensed ring together with an azole ring; $L^{11}$ represents a substituted methine group; $M^{11}$ represents a counterion necessary for neutralizing an electric charge of a molecule; and $n^{11}$ represents a number necessary for cancelling a total charge of the molecule.

* * * * *

UNITED STATES PATENT AND TRADEMARK OFFICE
CERTIFICATE OF CORRECTION

PATENT NO. : 5,580,711
DATED : December 03, 1996
INVENTOR(S) : Nobuaki KAGAWA et al.

It is certified that error appears in the above-indentified patent and that said Letters Patent is hereby corrected as shown below:

Title Page, item [21], the Appl. No., "619,152" should read --619,153--.

Claim 3, column 26, line 2, "sulfino groups.", should read --sulfino group.--.

Signed and Sealed this

Eighth Day of July, 1997

Attest:

BRUCE LEHMAN

*Attesting Officer*    *Commissioner of Patents and Trademarks*